United States Patent
Löytty (10) Patent No.: US 9,617,875 B2
(45) Date of Patent: Apr. 11, 2017

(54) METHOD AND APPARATUS FOR ACHIEVING A HIGH EFFICIENCY IN AN OPEN GAS-TURBINE (COMBI) PROCESS

(71) Applicant: Ari Löytty, Vuohijärvi (FI)

(72) Inventor: Ari Löytty, Vuohijärvi (FI)

( * ) Notice: Subject to any disclaimer, the term of this patent is extended or adjusted under 35 U.S.C. 154(b) by 438 days.

(21) Appl. No.: 14/197,252

(22) Filed: Mar. 5, 2014

(65) Prior Publication Data

US 2014/0250906 A1     Sep. 11, 2014

(30) Foreign Application Priority Data

Mar. 5, 2013   (FI) ..................................... 20130076

(51) Int. Cl.
| | |
|---|---|
| *F02C 6/00* | (2006.01) |
| *F02C 6/18* | (2006.01) |
| *F01K 23/10* | (2006.01) |
| *F02C 7/224* | (2006.01) |

(52) U.S. Cl.
CPC ............ *F01K 23/10* (2013.01); *F01K 23/106* (2013.01); *F02C 6/18* (2013.01); *F02C 7/224* (2013.01); *Y02E 20/14* (2013.01)

(58) Field of Classification Search
CPC ...... F01K 23/10; F01K 23/101; F01K 23/103; F01K 23/105; F01K 23/106; F01K 23/108; F01K 7/06; F01K 7/08; F05D 2270/301; F02C 7/224; F02C 6/18
See application file for complete search history.

(56) References Cited

U.S. PATENT DOCUMENTS

| | | | | |
|---|---|---|---|---|
| 3,879,616 | A * | 4/1975 | Baker | F01K 13/02 290/2 |
| 4,576,124 | A * | 3/1986 | Martens | F01K 23/108 122/406.5 |
| 5,255,507 | A * | 10/1993 | Gounder | F01K 23/061 60/39.12 |
| 5,491,971 | A * | 2/1996 | Tomlinson | F01K 23/106 60/39.182 |
| 5,661,968 | A * | 9/1997 | Gabriel | F02C 7/185 60/39.182 |
| 5,678,401 | A * | 10/1997 | Kimura | F01K 23/103 60/39.182 |

(Continued)

FOREIGN PATENT DOCUMENTS

| | | | | |
|---|---|---|---|---|
| EP | 2957731 A1 * | 12/2015 | | F01K 21/042 |
| EP | 2957733 A1 * | 12/2015 | | F01K 21/042 |

(Continued)

*Primary Examiner* — Essama Omgba
(74) *Attorney, Agent, or Firm* — Seppo Laine Oy (57) ABSTRACT

Within the process a supercharged first combustion chamber is followed by: a first turbine, a second combustion chamber, a second turbine, and a preheating heat exchanger. Primary bleed water vapor coming from the secondary process, or a mixture of the bleed water vapor and air coming from the supercharger, are preheated. Secondary-process feed water is vaporized in a waste heat boiler. The combustion gases are expanded in the second turbine to a pressure 0.5 bar lower than that of the surrounding atmospheric pressure. The remaining combustion gases are compressed by a combustion-gas supercharger to the surrounding atmospheric pressure.

23 Claims, 6 Drawing Sheets

(56) References Cited

U.S. PATENT DOCUMENTS

| | | | |
|---|---|---|---|
| 5,953,900 A * | 9/1999 | Bannister | F01D 25/12 60/39.17 |
| 6,141,952 A * | 11/2000 | Bachmann | F01K 23/10 60/39.182 |
| 6,223,520 B1 * | 5/2001 | Kita | F01K 23/108 60/783 |
| 6,244,035 B1 * | 6/2001 | Krill | F01K 23/10 60/39.182 |
| 6,263,661 B1 | 7/2001 | van der Burgt et al. | |
| 6,405,520 B1 * | 6/2002 | Thiel | F01K 23/106 60/39.182 |
| 6,442,924 B1 * | 9/2002 | Talley | F01K 23/103 60/39.182 |
| 6,651,421 B2 * | 11/2003 | Coleman | F02C 3/13 60/39.17 |
| 6,848,249 B2 * | 2/2005 | Coleman | F02C 3/13 60/39.17 |
| 7,007,453 B2 * | 3/2006 | Maisotsenko | F01K 21/047 415/178 |
| 7,472,550 B2 * | 1/2009 | Lear, Jr. | F01D 15/005 60/39.511 |
| 8,505,309 B2 * | 8/2013 | Gardiner | F02C 6/18 60/39.182 |
| 9,239,009 B2 * | 1/2016 | Taguchi | F02C 6/18 |
| 2001/0029732 A1 | 10/2001 | Bachmann | |
| 2004/0103637 A1 * | 6/2004 | Maisotsenko | F01K 21/047 60/39.59 |
| 2012/0137651 A1 * | 6/2012 | Taguchi | F02C 6/18 60/39.183 |
| 2013/0227958 A1 | 9/2013 | Droux et al. | |
| 2014/0250905 A1 * | 9/2014 | Loytty | F01K 23/10 60/775 |
| 2014/0250906 A1 * | 9/2014 | Loytty | F01K 23/10 60/775 |
| 2015/0192037 A1 * | 7/2015 | Sharp | F01K 23/10 60/39.182 |
| 2015/0192039 A1 * | 7/2015 | Sharp | F01K 23/10 60/39.182 |
| 2015/0369125 A1 * | 12/2015 | Reiter | F01K 21/042 60/775 |
| 2016/0090913 A1 * | 3/2016 | Taguchi | F02C 6/18 60/734 |
| 2016/0177822 A1 * | 6/2016 | Howes | F02C 6/16 60/785 |

FOREIGN PATENT DOCUMENTS

| | | |
|---|---|---|
| JP | 2000337108 A | 12/2000 |
| JP | 2003193865 A * | 7/2003 |

* cited by examiner

METHOD AND APPARATUS FOR ACHIEVING A HIGH EFFICIENCY IN AN OPEN GAS-TURBINE (COMBI) PROCESS

FIELD OF INVENTION

The invention relates to a method and apparatus for achieving a high efficiency in an open gas-turbine (combi) process.

BACKGROUND OF INVENTION

In existing gas-turbine combi processes, a supercharger compresses air, which is burned with fuel in a combustion chamber, which is followed by a turbine and a waste-heat boiler, in which water of the secondary-process circulation is vaporized. In the secondary-process circulation there is normally a vapor process, which, in the newest large plants, uses reheating of the water vapor. In the secondary process, after a low-pressure turbine, the water vapor condenses in a condenser into water, which is compressed by a pump to a maximum pressure, and preheated and vaporized in the waste-heat boiler. After the waste-heat boiler, the water vapor goes to the steam turbines of the process circulation.

Using natural gas as the fuel, electricity is nowadays generally produced in a combined gas-turbine-steam power-plant process. Gasified coal is also beginning to be used as a fuel in these. A problem is the large energy requirement for compression and the wasting of a great deal of energy along with the condensation heat of the water vapor. Similarly, in the low-pressure range the efficiency of the water-vapor process is poor and there is no benefit from the second combustion chamber in the gas-turbine combi process. Similarly, the maximum pressure of the gas turbine limits the pressure ratio. At the present moment, the highest efficiency in the world for a combi power plant is 60.7% in the Irsching power plant completed in 2011. The next goal of the manufacturers of the Irsching plant is to achieve 61.5% in 2015, by increasing the initial values.

SUMMARY OF THE INVENTION

It is an object of embodiments of the invention to combine the expansion of the medium to a pressure that is lower than atmospheric pressure with the injection of water vapor into the gas-turbine process. In the STIG process, water vapor is fed to the gas-turbine process, so that its implementation in practice is not a problem. There is no existing open gas-turbine-steam-turbine process, in which the combustion gases expand in the primary-process turbine to a pressure lower than the ambient pressure and the combustion gases exhaust from the combustion-gas compressor in the gas-turbine process, to say nothing of injecting water vapor into such a process. By means of a second combustion chamber of the gas-turbine process, the efficiency can be raised, if the air and/or water vapor are preheated using the combustion gases, so that the exhaust temperature of the combustion gases from the turbine can be raised by means of the second combustion chamber. In existing combi processes incorporating two combustion chambers, a higher efficiency is not achieved.

The reason for this is not easy to determine, but closer investigation of the matter shows that the energy loss of the waste-heat boiler is great, because the exhaust temperature of the combustion gases after the second combustion chamber is high. This problem, i.e. the large energy loss of the waste-heat boiler of a two-combustion-chamber gas-turbine combi, is solved in the invention and no other invention representing the same type has solved this problem in a gas-turbine-steam-turbine COMBI plant containing two combustion chambers. Because the invention solves the problem relating to the waste-heat boiler of a two-combustion-chamber combi plant, it should be compared to other combined gas-turbine-steam-turbine combi power plants containing two combustion chambers.

The feeding of water vapor from a secondary-process bleed to such a process is also an inventive solution. Thus, by means of the invention, an efficiency higher than the highest efficiency of any gas-turbine combi plant in the world is achieved. The present highest efficiency is achieved using a single combustion chamber, so that the use of two combustion chambers is not a solution obvious to one skilled in the art, but depends on the totality. There is no reference to the invention in the literature, to say nothing of it actually existing, because the inventive idea has been presented only in the accompanying patent application. Naturally, nearly all inventions can be created by taking one feature from one solution, another from another, and so on. However, the invention contains sufficiently many simultaneous differences compared to any patent whatever for it to be inventive.

Figure 4:
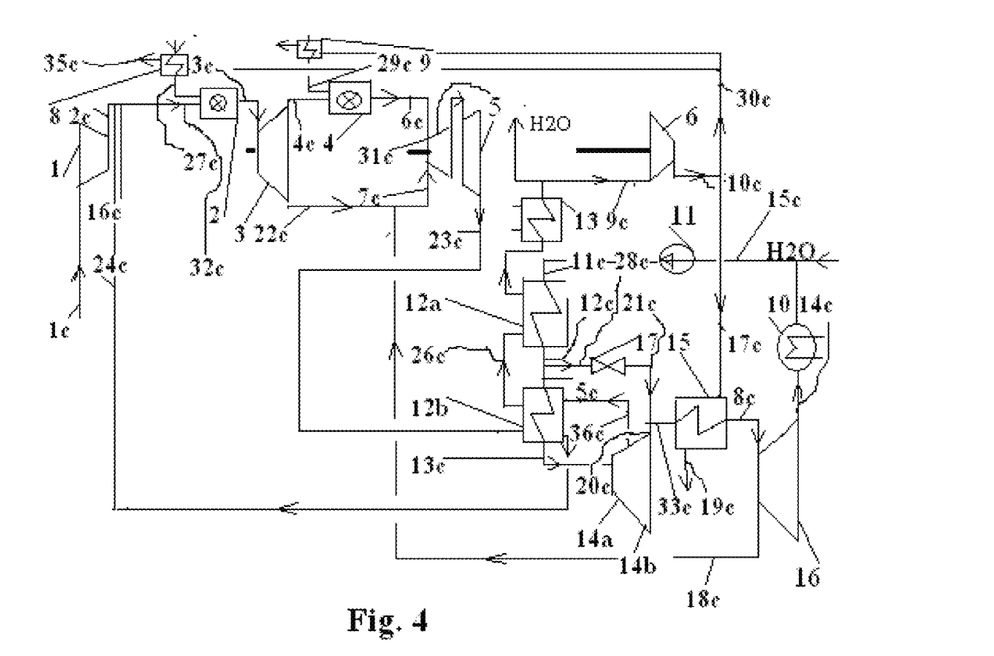
FIG. 4 shows a process, in which the second turbine is two-part. Otherwise the process corresponds to FIG. 3. Table 2 corresponds to the state points of FIG. 4.

When compared to patent US 2001029732 A1 there is a difference in the pressure level of the waste-heat boiler after the second turbine (5). Compared to the invention's at least 0.5 bar less than atmospheric pressure practice, most constructions have a pressure level of less than 0.3-0.2 bar. In the US patent, "waste heat boiler 33 is not supercharged but operates at about atmospheric pressure". Similarly, in a second US patent U.S. Pat. No. 6,263,661 B1, "subatmospheric pressure (about 0.6 bar)", in other words a different pressure range is in question. In addition, this US patent in question does not have a steam-turbine process. For its part, in patent JP 2000337108 A, only the carbon dioxide arising in combustion is finally pressurized. In addition, the circulation substance is not air, but instead oxygen is brought to the circulation process, i.e. it is a more complex plant. FIG. 4 in US application publication 20130227958 A1 shows the obvious implementation of the most significant manufacturer in the field, relating to a two-combustion-chamber process.

Thus, the invention meets the inventiveness requirements. This position is supported by common knowledge on the internet (Wikipedia's "combined cycle" article) and the endorsement of the invention by the acknowledged research institute KIC Innoenergy, which is part of the European Institute of Innovation and Technology (EIT).

Furthermore, it is an aspect of certain embodiments of the invention that reheating of the water vapor of the secondary process takes place by means of waste heat—for example, by the waste heat of the combustion-gas supercharger.

Nowadays, it is sought to increase the maximum pressure in a gas-turbine process and it would not occur to anyone to reduce the pressure, because the efficiency of the components would possibly drop by 1-2 percentage units and volume flows would increase, when the price of the components would rise. However, in an example calculation, in a 0.2-bar gas-turbine process, i.e. one that has expanded to five times its volume, output of about 3-5-times is obtained with the same mass flow of air, because water vapor is fed to the process in the primary circulation and its expansion does not consume energy. The idea of the invention has also been expansion in the primary circulation to a pressure lower than atmospheric pressure at a high temperature, because the compression of the carbon dioxide arising in combustion after the removal of the water vapor arising in combustion takes a smaller amount of energy than the compression of oxygen would take. In addition, the water vapor condenses at a lower temperature, so that the energy loss is smaller. Further, reference is made to the inventive feature that the water vapor expands in a gas-turbine process at a very high temperature compared to that at which it expands in a low-pressure steam turbine. For these reasons, by means of the invention by far the highest efficiency in the world of a combi power plant is achieved. At a high outdoor temperature the invention is relatively even better compared to the present practice.

In existing open gas-turbine processes and the STIG process, the minimum pressure is atmospheric pressure. In the process according to the invention, the combustion gases expand in the gas-turbine process to a pressure lower than atmospheric pressure, so that by means of the injection of water vapor more work is obtained, particularly at a pressure lower than atmospheric pressure, than would be obtained in a steam turbine while the compression of the combustion gases takes less energy than the compression of air would, because only a fraction of the oxygen in the air need be compressed to atmospheric pressure by the combustion-gas supercharger, and the compression of the carbon dioxide arising in combustion takes less energy than the compression of the air used in combustion would take. The invention relates to a method for achieving a high efficiency in an open gas-turbine (combi) process, in which a supercharger compresses the air required for combustion, which is burned with a fuel in a first combustion chamber, which is followed by a first turbine, a second combustion chamber, a second turbine, preheating to a heat exchanger, and a waste-heat boiler, in the feed water of the secondary process is vaporized. The method according to the invention is characterized by:

- expanding the combustion gases in the second turbine after the second combustion chamber to the end of the expansion stage and to the minimum pressure of the expansion of the primary process, i.e. to the pressure after the second turbine and to a pressure in the primary process of at least 0.5-bar lower that the surrounding atmospheric pressure;
- condensing and removing the vapor arising in combustion, and other water vapor from the negative-pressure combustion gases, at the latest after the precooler following the negative-pressure waste-heat boiler;
- pressurizing all the rest of the combustion gases, including the nitrogen of the air and the carbon dioxide arising in combustion, by a combustion-gas supercharger, into the surrounding atmosphere and out of the gas-turbine process;
- condensing into a liquid the water vapor arising in combustion at a pressure lower than atmospheric pressure in the primary process;
- taking water vapor from a primary bleed from the steam turbine of the secondary process, which is injected after the preheating heat exchanger to the gas-turbine process after the supercharger; and
- bringing to the secondary process before the pump an amount of additional water at the same pressure, corresponding to the primary bleed of the secondary process.

In other words, an existing open (or closed gas-turbine process) or STIG-process does not provide a solution to this, i.e. in none of these is a circulation substance compressed, from which the water vapor arising in combustion has been removed, thus reducing the energy requirement of the compression. In existing gas-turbine processes, the combustion gases exhaust from the turbine to the surrounding atmospheric pressure. In addition, the second turbine follows the second combustion chamber, so particularly the water vapor expands in the turbine to the end of its expansion at as high a temperature as possible.

The 0.5 bar referred to in the claims is not an optimum point and expansion taking place to about 0.2 bar, shown in Table 1, will lead to a greater efficiency. Similarly, the water vapor arising in combustion in an open (or closed) gas-turbine process or STIG process condenses into liquid at atmospheric pressure. In the process according to the invention, the water vapor arising in combustion condenses into liquid at a pressure lower than atmospheric pressure, so that the energy loss is smaller.

Various embodiments of the invention are characterized by what is stated in the accompanying claims. In the following, the invention is described with more detailed examples, with reference to the accompanying drawings, in which

BRIEF DESCRIPTION OF THE DRAWINGS

FIG. 1 shows the basic process of the invention. The bleed of the higher pressure steam process will hereinafter be referred to as the primary bleed and the lower pressure bleed as the secondary bleed. The secondary bleed is not essential in the process.

DETAILED DESCRIPTION OF EXEMPLARY EMBODIMENTS

Figure 1:
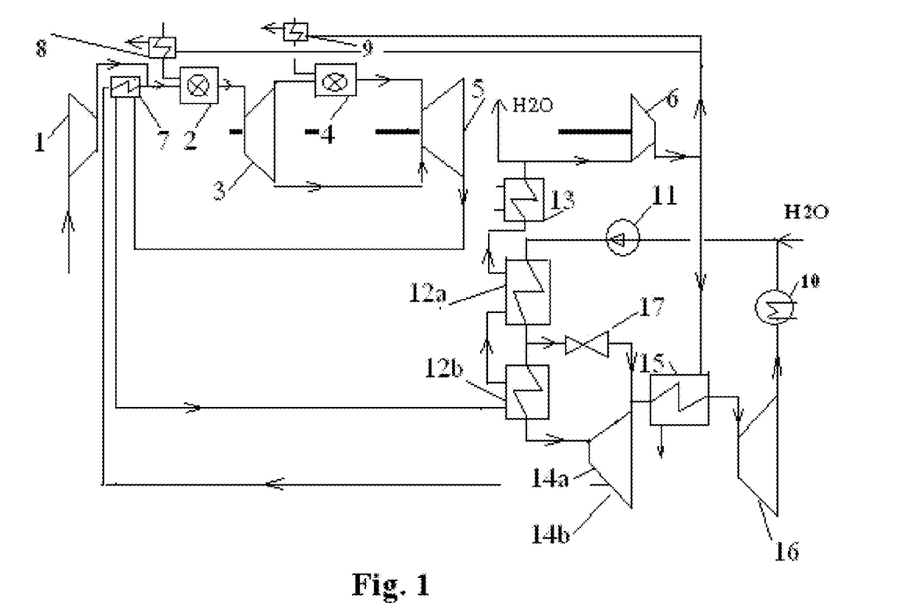

FIG. 1 shows an open gas-turbine (combi) process, in which a supercharger (1) compresses air, which is burned with fuel in a first combustion chamber (2), which is followed by a first turbine (3), a second combustion chamber (4), a second turbine (5), and a preheating heat exchanger (7), in which primary bleed steam coming from the secondary process is preheated.

The combustion gases go from the preheating heat exchanger (7) to a waste-heat boiler (12a, b), in which the feed water of the secondary process is vaporized. For reasons of clarity, the water-heat boiler is shown in two parts (12a, b), though in reality it consists of a single heat exchanger. Preheating of the maximum-pressure water takes place mainly in waste-heat boiler (12a) and vaporization and superheating mainly in waste-heat boiler (12b). The combustion gases expand in the second turbine (5) to a pressure lower than that of the surrounding atmospheric pressure, when the combustion gases remaining after the precooler (13) and condensation and exhaust are compressed by a combustion-gas supercharger (6) to the surrounding atmospheric pressure.

In the secondary process, after the low-pressure turbine, the water vapor condenses in the condenser (10) into water, which is compressed by a pump (11) to a maximum pressure and is preheated and vaporized in the waste-heat boiler (12a, b). After the waste-heat boiler (12a, b), the water vapor goes to a combined high/medium-pressure turbine (14a, b), from where a primary bleed is taken, which is injected after the preheating heat exchanger (7) into the gas-turbine process after the supercharger (1). The water-vapor high-pressure turbine can naturally be formed of a separate high-pressure (14a) and medium-pressure turbine (14b), in which case the primary bleed can be taken from between the high-pressure and the medium-pressure turbines. Before the low-pressure turbine (16), the water vapor is intermediately reheated with the waste heat of the combustion-gas supercharger (6) in a heat exchanger (15).

The fuel is natural gas, which is preheated in the first fuel-preheating heat exchanger (8) and in the second fuel-preheating heat exchanger (9) by the waste heat from the combustion-gas supercharger (6) (in the case in the figure). In the precooler (13) there is no nominal pressure loss, because a relatively high pressure loss is used in the waste-heat boiler (12a, b) and, on the other hand, precooling can be implemented at the end of the waste-heat boiler by feeding water to the waste-heat boiler (12a). Because plenty of waste heat is obtained from the combustion-gas supercharger (6), in FIG. 1 some of the preheated water is taken after the waste-heat boiler (12a) and the decompression valve (17) to the water-vapor intermediate-reheating heat exchanger (15), in which the water vapor can be intermediately reheated. In practice, cooling is taken to the first turbine (3) in the same way as the second turbine (5), i.e. about 10% of the mass flow bypasses the combustion chamber. In order to simplify the matter and the calculations, this is not shown in the figure. Similarly, the heat exchanger (15) is not necessarily required. Possible intermediate reheating of the water vapor of the secondary process then takes place in the waste-heat boiler (12a) or (12b).

Figure 2:
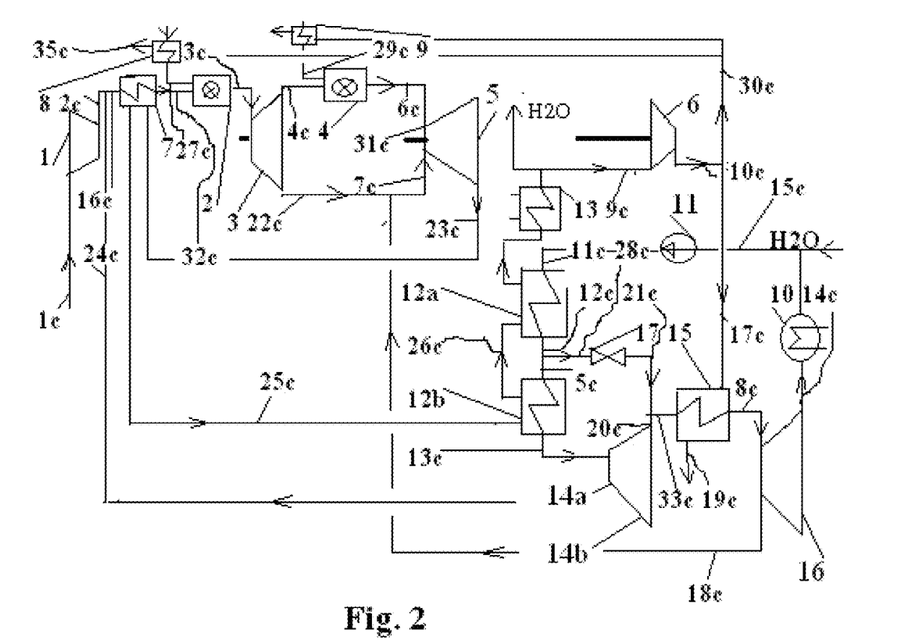
FIG. 2 shows a construction of the invention, in which the air coming from the supercharger is also preheated before the combustion chamber. Otherwise the process corresponds to FIG. 1 except in terms of the cooling of the second turbine (5). Table 1 corresponds to state points of FIG. 2. In the figures, the state points are numbered by adding the letter c after the number and the components mainly by only numbers.

FIG. 2 differs from FIG. 1 only in that air coming from the supercharger (1) is also preheated in the preheating heat exchanger (7). Naturally, also only some of the air coming from the supercharger (1) can be preheated, or the air coming from the supercharger need not, if wished, be heated, as is the case in the process according to FIG. 1. There is a difference also in the cooling of the second turbine (5), which takes place partly by the secondary bleed of the water-vapor process. The values of the state points are shown as a table in Table 1.

Figure 3:
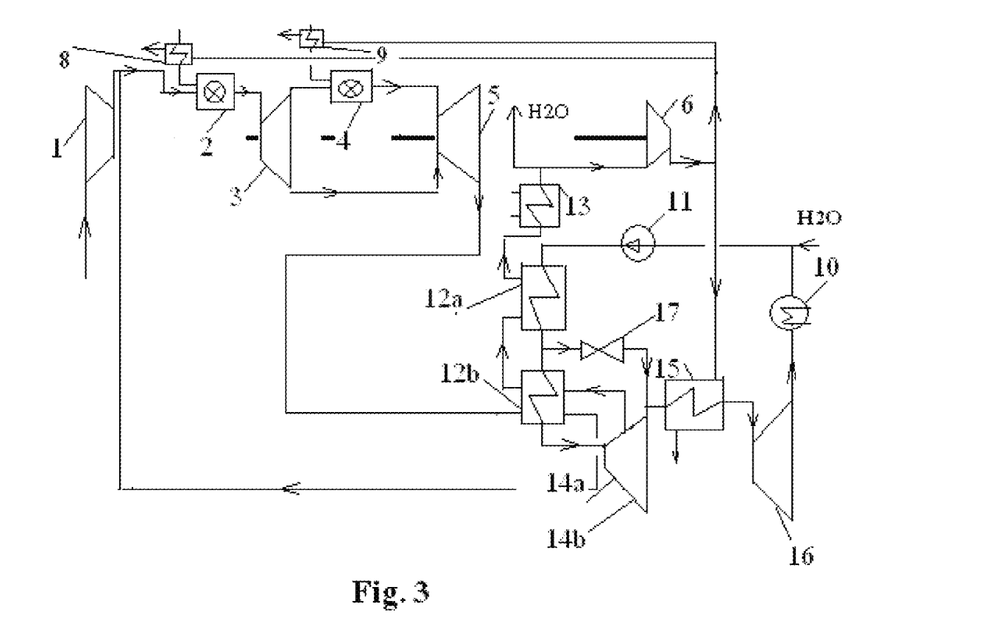
FIG. 3 shows a process, in which the primary bleed is preheated in the waste-heat boiler (12 b). I.e., the preheating heat exchanger (7) is part of the waste-heat boiler (12 b). Otherwise the process corresponds to FIG. 1.

FIG. 3 shows a process that is otherwise according to FIG. 1, but in which waste-heat boiler (12b) acts as the preheating heat exchanger (7) of the primary bleed.

FIG. 4 shows a process, in which the second turbine (5) is formed of two consecutive turbines. The reason for this is that the mean heat-input is raised by reducing the pressure ratio of the first turbine (3), when in practice the pressure ratio of the second turbine (5) becomes so great that it must be two-part. Otherwise, FIG. 4 does not differ from FIG. 1, except that the waste-heat boiler acts as the preheating heat exchanger of the primary bleed, as in FIG. 3. Similarly, the cooling of the second turbine (5) is according to FIG. 2. The values of the state points are shown in Table 2. Actually, the values shown in the tables, i.e. the pressure ratio of the second turbine (5), can be just about achieved with a plant according to FIG. 3.

Figure 5:
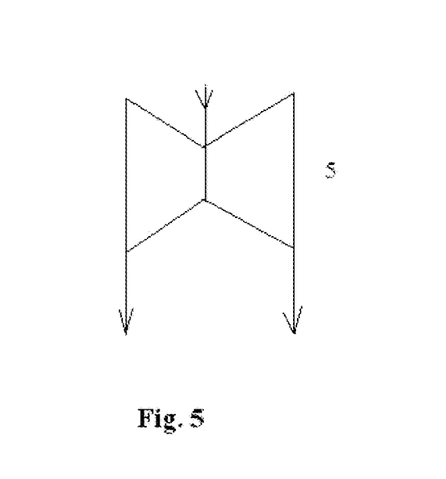
FIG. 5 shows the second turbine, formed of two parallel turbines, of the gas-turbine process. Such is used in the low-pressure turbines of the steam process, in which the volume flows are large. Probably these would not yet be needed in, for example, a 200-MW plant according to the invention.

FIG. 5 can be compared to the low-pressure turbine of a steam power plant, in which two parallel turbines are used due to the large volume flows. It is possible that parallel combustion-gas superchargers (6) will also be needed.

Figure 6:
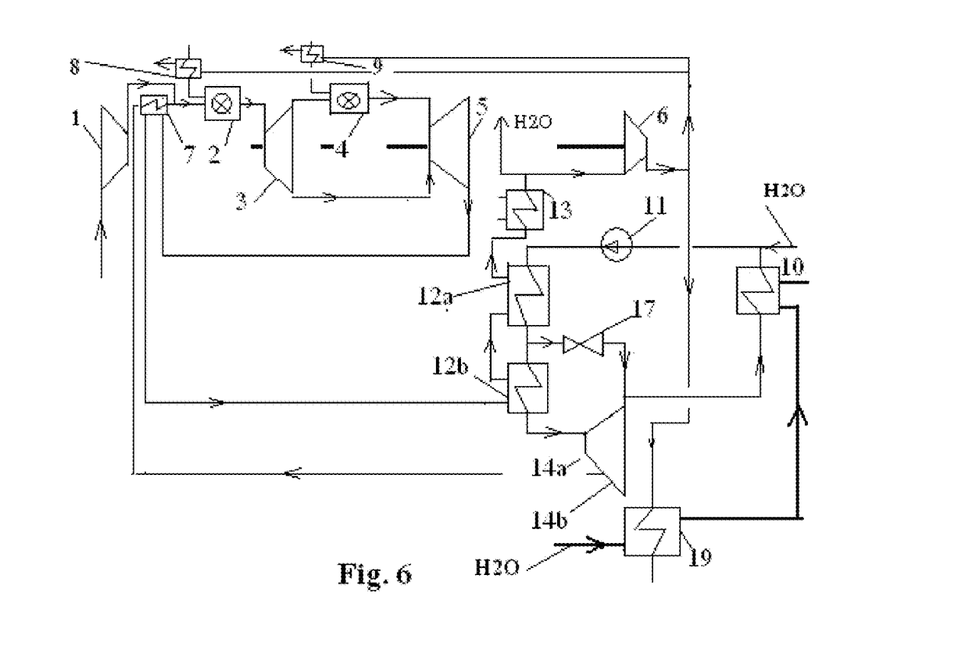
FIG. 6 shows a district-heating process according to the invention. In it, the condenser is replaced by heat exchanger connected to the district-heating network.

FIG. 6 relates to a district-heating application of the invention. By means of the invention, a relatively higher electricity generating efficiency can be achieved as a district-heating plant, compared to an existing condensing power plant. The condenser (10) is shown as a heat exchanger. Intermediate reheating is not required, so that 1-stage heating takes place in the heat exchanger (19). If the heat exchangers (19) and (10) are located in parallel, a higher final temperature of the district-heating water can be achieved. The heat of the precooler (13) can also be exploited, allowing utilization of the condensation heat of the water vapor.

Figure 7:
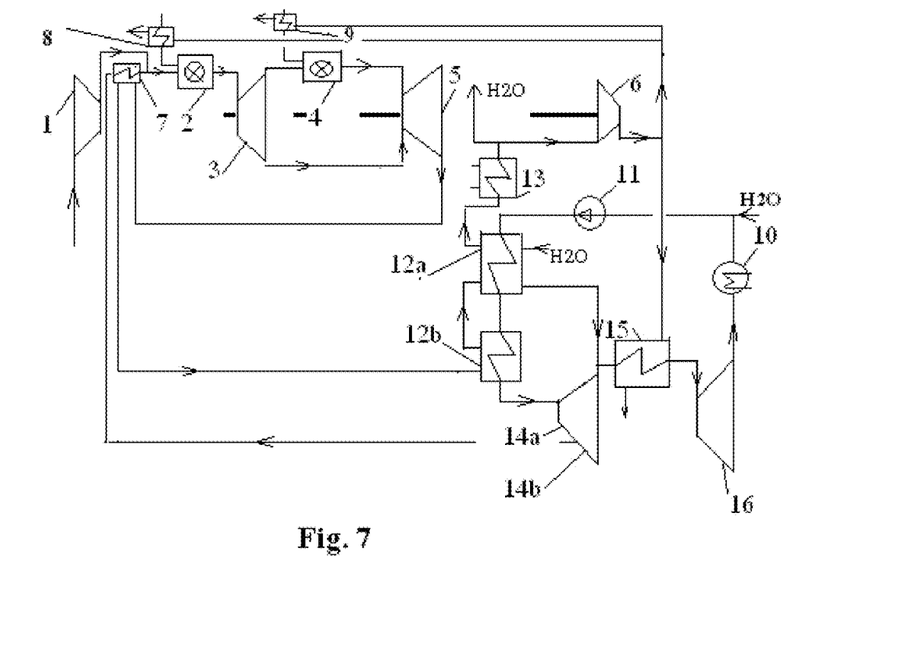
FIG. 7 shows a process, which corresponds to the existing so-called dual-pressure-level process.

In FIG. 7, the low-pressure circulation can first of all be vaporized at least partly also in the heat exchanger (15), and after that in the waste-heat boiler. This corresponds to the existing so-called dual-pressure-level process.

Figure 8:
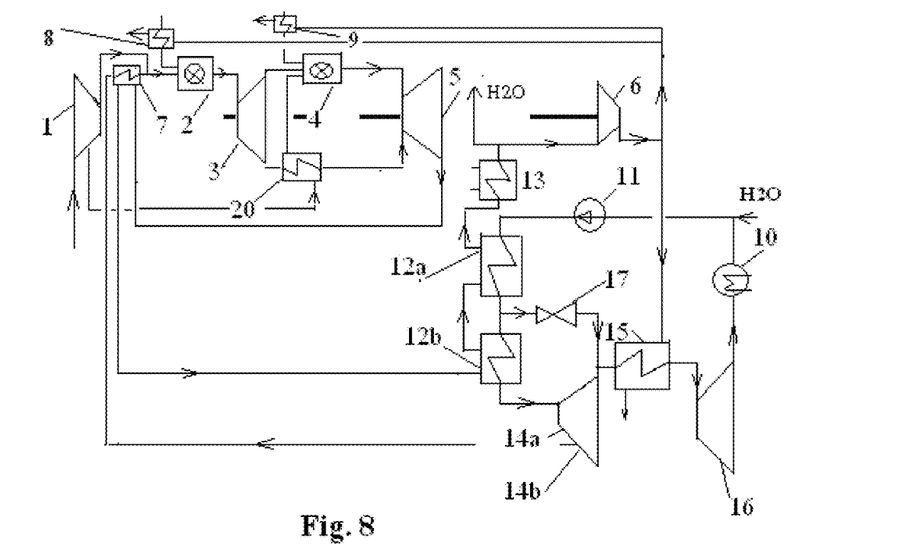
FIG. 8 shows a process, in which additional air is brought from a supercharger to the second combustion chamber.

FIG. 8 relates to a construction, in which additional air is fed to the second combustion chamber. This is taken as bleed from the supercharger (1) and can, if necessary, be preheated according to the figure, or, for example, in the waste-heat boiler (12b). Naturally, additional air going to the oxygen-manufacturing process can also be taken as bleed from the supercharger (1).

Figure 9:
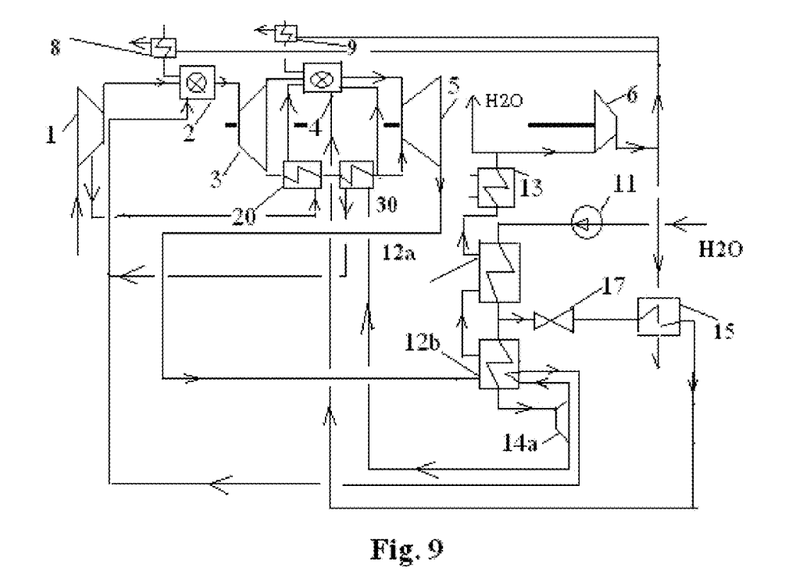
FIG. 9 corresponds to a process where the primary bleed of the secondary process can be 100% of the mass flow, so that a steam turbine and low-pressure steam turbine will not be needed.
Figure 10:
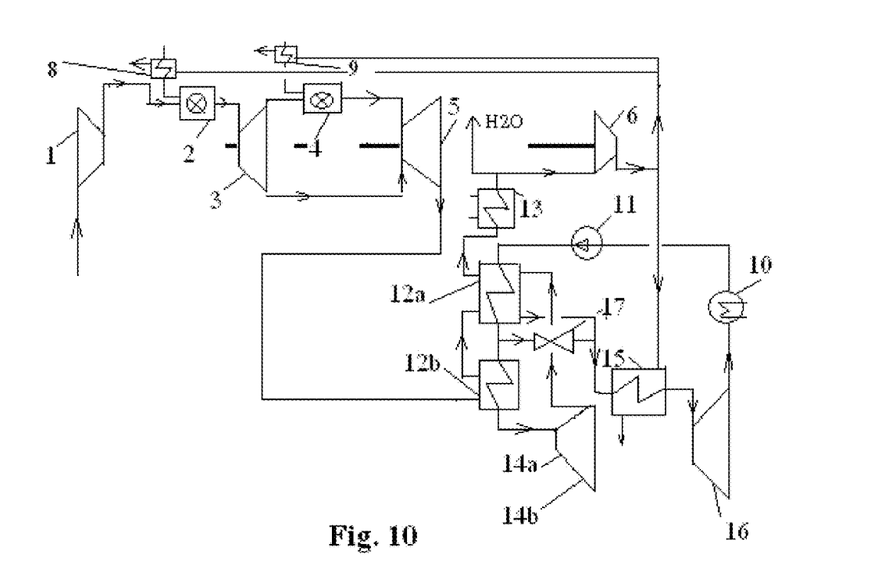
FIG. 10 corresponds to a process, in which the primary bleed of the secondary process is 0% of the mass flow of the secondary process.

FIG. 9 relates to the text of the final part of the description portion "the primary bleed of the secondary process can be 100% of the mass flow, in which case the steam turbine (14b) and the low-pressure steam turbine (16) will not be needed". Naturally, the other extreme is a process, in which the primary bleed of the secondary process is 0% of the mass flow going to the secondary process's steam turbine (14a), i.e. there is no primary bleed in the process. FIG. 10 relates to this case.

In FIG. 9, the primary bleed of the secondary process, which is thus 100% of the mass flow coming from the steam turbine (14a), goes partly directly to the cooling of the first combustion chamber (2) and partly is preheated in the waste-heat boiler (12b) and in the heat exchanger (30) following it before the first combustion chamber (2). The water vapor coming from the decompression valve (17) is preheated in the heat exchanger (15), after which it goes to cooling the second combustion chamber (4). Additional air is taken to the second combustion chamber (4) from the supercharger (1) bleed, which is preheated in the heat exchanger (20) by the mass flow coming from the first turbine (3) and going to the heat exchanger (30). After this, the supercharger (1) bleed goes to the second combustion chamber (4) and the mass flow coming from the heat exchanger (30), used for cooling second turbine (5), is partly also used for cooling the second combustion chamber (4). Otherwise, FIG. 9 corresponds to the process according to FIG. 1. Naturally, the entire bleed can also be preheated in the waste-heat boiler (12*b*).

FIG. 10 corresponds to the opposite extreme to FIG. 9, as in it the primary bleed of the secondary process is 0% of the mass flow coming from the steam turbine (14*a*). After the steam turbine (14*b*) in the secondary process the water vapor is reheated in the waste-heat boiler (12*a*). Otherwise, the process corresponds to FIG. 1. Naturally, in the joint production of electricity/heat the most general solution is to omit reheating.

Figure 11:
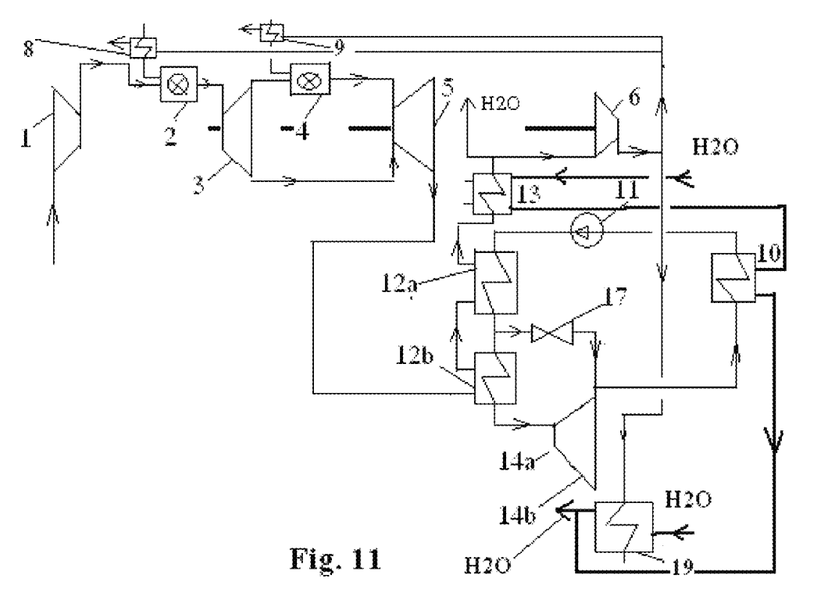
FIG. 11 corresponds to the process according to FIG. 6, but with the district-heating water circulating in the opposite direction, and the process does not have secondary-process bleed.

FIG. 11 differs from FIG. 6 mainly in the circulation direction of the district-heating water. In the process according to FIG. 11, the condensation heat of the water vapor arising in combustion is then utilized in the heat exchanger (13), after which the district-heating water further heats in the heat exchanger (10), which is thus the secondary circulation condenser. From the heat exchanger (10), the district-heating water goes to the district-heating network, to which the district-heating water heating in the heat exchanger (19) is also connected. Naturally, after the heat exchanger (10) the district-heating water could also go to the heat exchanger (19), in which case a slightly lower secondary-circulation minimum pressure can be used. This also differs from FIG. 6 in that the secondary-process primary bleed mass flow is 0%.

In certain embodiments there is a secondary or water-vapor process. Water vapor is condensed into liquid in a condenser and is compressed by a pump to a maximum pressure and goes after that to the waste-heat boiler and expands in a high/medium-pressure steam turbine and is intermediately reheated in a heat exchanger and expands in a low-pressure steam turbine before the condenser. Reheating can take place in the heat exchanger (15) using the waste heat of the combustion-gas supercharger (6) or the heat exchanger (15) can be formed by waste-heat boiler (12*a*). If it is wished for reheating to take place at a high temperature, the heat exchanger (15) can be formed by waste-heat boiler (12*b*).

Within certain embodiments of the present invention precooling of the combustion gases going to the combustion-gas supercharger takes place by water injected into the waste-heat boiler or precooler. Precooling of the combustion gases takes place in the final part of the waste-heat boiler (12*a*) by injecting water into the waste-heat boiler (12*a*). The temperature deficit of the heat exchange can then be reduced, i.e. the initial temperature of the combustion-gas supercharger (6) reduced. At the same time, the particles will dissolve in the water vapor being injected. A precooler (13) will not necessarily be required then. Of course, water injection can also be made to the precooler (13). Similarly, precooling can also take place traditionally by heat transfer, by taking the cooling water to the heat exchanger (13) in such a way that it is not mixed with the combustion-gas flow.

The preheating of the fuel—for example, natural gas—may be accomplished in first and second fuel preheating heat exchangers. However, this preheating can naturally be implemented in many different ways wherever heat is available, without anything particularly inventive being related to it.

Within certain embodiments of the present invention there is a situation, in which, due to the low thermal value of the fuel, additional oxygen or air must be fed to the process. This may be accomplished from a supercharger bleed or an oxygen-manufacturing process. A practical situation could be, for example, a power plant using two different fuels. The fuel to be fed to the second combustion chamber (4) can be freely selected by the designers. Naturally, a mixture of the two fuels can also be fed to the same combustion chamber. If pure oxygen is fed to the process, the power requirement for its compression will naturally be lower if it is fed to latter, i.e. the second combustion chamber (4). It is sensible to take additional air that will possibly be fed to this combustion chamber as bleed from the supercharger (1). If necessary, air to be used in the manufacture of oxygen can also be taken as bleed from the supercharger (1).

Some embodiments of the present invention involve a practical situation, in which the waste-heat boiler (12*a, b*) consists of a single heat exchanger. However, the waste-heat boiler may also be comprised of connected heat exchangers. For reasons of clarity, the waste-heat boiler is described in a separated form. In waste-heat boiler (12*a*), preheating of the water takes place and in waste-heat boiler (12*b*) the vaporization and reheating of the water.

The intermediate reheating of the water vapor of the secondary process, may be accomplished, for example, either by waste-heat boilers or by the waste heat of the combustion-gas supercharger in the heat exchanger. For example, this can also be implemented in waste-heat boiler (12*a*). This is an important additional invention, because reheating can then be carried out, in a way, with waste heat, because there is, in a way, surplus low-temperature energy. If it is wished that reheating will take place at a higher temperature, it will then take place in waste-heat boiler (12*b*). The desired pressure level will naturally determine the turbine after which reheating takes place. Perhaps the most likely practical solution is, however, that reheating takes place using waste heat. In a district-heating plant, reheating may not necessarily be required. If reheating takes place in waste-heat boiler (12*b*), then in practice the reheating pressure will probably often be the pressure of the first combustion chamber (2), when primary bleed, which is led to the gas-turbine process, will be taken from the secondary circulation after reheating. If desired, the primary bleed can also be preheated.

The preheating of the additional air or oxygen described in the claims can also be performed in waste-heat boiler (12*b*).

All the example calculations are shown only to demonstrate the invention and naturally the values can be altered as desired.

Nowadays, it is sought to increase the maximum pressure, so that the supercharger (1) will, in practice, be two-part, with possible intermediate cooling, for instance when the supercharger is formed of two superchargers. In that case, three-stage combustion may be considered.

The primary bleed of the secondary process can naturally be led to any point after the supercharger (1), but at the latest to the beginning of the blades of the first turbine (3), for example, the bleed coming from the secondary process may be fed to the combustion chamber.

Although in the Claims there is preheating of the primary bleed in the secondary process, there will, of course, not necessarily be any need to preheat, if this is desired. However, by preheating a higher efficiency will be achieved.

By means of the invention many advantages will be achieved compared to existing plants. Naturally a very high efficiency is the most significant of these. In a district-heating plant, the efficiency will be relatively even higher compared to existing plants. At the same time, particle emissions and emissions of nitrogen oxides and carbon dioxide are significantly lower than in existing plants. Present technology can be applied to separate them. Similarly, the expensive steam-process low-pressure turbine has a mass flow that is about one-half of existing ones. The reduction in efficiency when the outdoor temperature rises is also clearly less than in existing processes, because the relative energy requirement for compression is smaller in the process and cold seawater, for example from a depth of 50-100 meters, can be used in the precooling heat exchanger (13). Similarly, it may be possible to use a higher final temperature in the combustion chamber (4), because the pressure level is low. In that case, three combustion chambers may be necessary in the process. The low pressure has the advantage of a smaller energy requirement for oxygen compression (gasification) in the gas-turbine process. There is also a smaller heat surface in the waste-heat boiler, because the heat-transfer coefficient is great due to the large water-vapor content of the combustion gases and, on the other hand, the relative share of the steam process in electricity production is smaller. Regulation at part load is also easy, for example by altering the water-vapor feed-mass flow and the mass flow of air, as well as in many ways by applying existing technology. Existing technology can also be applied in terms of starting and running down, as well as in the shafting of superchargers and turbines. The rate of wear of turbine blades is also slower, because the relative share of particles is smaller due to the low pressure in the second turbine (5). Naturally, there can also be additional combustion in the waste-heat boiler. Similarly, the carbon dioxide arising in combustion can be separated from the process by applying existing technology. Similarly, the power requirement of the superchargers can be reduced by water injection and then by exploiting the condensation heat of the water vapor after the combustion-gas supercharger (6), for example in a district-heating process. The expansion energy of natural gas can also be exploited if necessary. Similarly, two or more fuels can be used in a power plant, for example, natural gas in a gaseous or liquid form, or gasified coal or hydrogen. Naturally, the secondary-process primary bleed can also be 100% of the mass flow, when the steam turbine (14b) and low-pressure steam turbine (16) will not be needed.

The examples of embodiments of the invention are described only to illustrate the invention and do not form any restriction to the scope of protection of the invention, because the details, such as water treatment and the generator(s), which are not necessary in order to understand the invention, have been omitted for reasons of clarity. The invention is easy to modify in various ways without particular inventiveness. Thus, the invention is not limited to the structural forms described, but includes everything that can be included in the scope of the following claims.

TABLE 1

| | p(bar) | T(K) | h(N2) kj/kg | h(O2) kj/kg | h(CO2) kj/kg | h(H2O) kj/kg | h(CH4) kj/kg |
|---|---|---|---|---|---|---|---|
| 1c | 1.0 | 288 | 15.6 | 12.6 | | | |
| 2c | 20.0 | 713.4 | 467.5 | 427.6 | | | |
| 3c | 19.2 | 1673.0 | 1614.3 | 1491 | 1656.4 | 5678 | |
| 4c | 2.4 | 1122.0 | 936.7 | 867.3 | 933.3 | 4273 | |
| 5c | 173.5 | 627 | | | | 1710 | |
| 6c | 2.35 | 1800 | 1775 | 1639.7 | 1827.3 | 6026 | |

TABLE 1-continued

| | p(bar) | T(K) | h(N2) kj/kg | h(O2) kj/kg | h(CO2) kj/kg | h(H2O) kj/kg | h(CH4) kj/kg |
|---|---|---|---|---|---|---|---|
| 7c | 2.35 | | | | | | |
| 8c | 2.35 | 475 | | | | 2870 | |
| 9c | 0.202 | 308 | 36.4 | 31.1 | 29.6 | | |
| 10c | 1.02 | 508.5 | 246.4 | 221.4 | 218.7 | | |
| 11c | 177.0 | 300 | | | | 130 | |
| 12c | 173.5 | 627 | | | | 1710 | |
| 13c | 170.0 | 873 | | | | 3560 | |
| 14c | 0.036 | | | | 2302 | | |
| 15c | 0.035 | 300 | | | | 111 | |
| 16c | 20.0 | | | | | | |
| 17c | 1.02 | | | | | | |
| 18c | 2.35 | 475 | | | | 2870 | |
| 19c | 1.0 | 419 | 152.2 | 135.2 | 130.4 | | |
| 20c | 2.4 | 399 | | | | 2654 | |
| 21c | 2.4 | | | | | 1680 | |
| 22c | 2.4 | 1122.0 | 936.7 | 867.3 | 933.3 | 4273 | |
| 23c | 0.214 | 1080.3 | 887.2 | 821.2 | 880.7 | 4173 | |
| 24c | 20.0 | 578 | | | | 3035 | |
| 25c | 0.21 | 930 | | | | | |
| 26c | 0.206 | 647 | 394.7 | 359.7 | 365.4 | 3218 | |
| 27c | 19.6 | 475 | | | | | 491 |
| 28c | 173.5 | 627 | | | | 1710 | |
| 29c | 2.4 | 475 | | | | | 497 |
| 30c | 1.02 | | | | | | |
| 31c | 2.35 | 1673 | 1614.3 | 1491 | 1655.5 | 5680 | |
| 32c | 19.6 | 879 | 653.1 | 602.6 | | 3703 | |
| 33c | 2.4 | | | | | | |

TABLE 2

| | p(bar) | T(K) | h(N2) kj/kg | h(O2) kj/kg | h(CO2) kj/kg | h(H2O) kj/kg | h(CH4) kj/kg |
|---|---|---|---|---|---|---|---|
| 1c | 1.0 | 288 | 15.6 | 12.6 | | | |
| 2c | 20.0 | 713.4 | 467.5 | 427.6 | | | |
| 3c | 19.6 | 1673 | 1614.3 | 1491 | 1656.4 | 5678 | |
| 4c | 4.335 | 1260.6 | 1103.2 | 1021.8 | 1110.5 | 4610 | |
| 5c | 173.5 | 627 | | | | 1710 | |
| 6c | 4.248 | 1770 | 1737 | 1604.6 | 1786.6 | 5943.6 | |
| 7c | 4.335 | | | | | | |
| 8c | 4.335 | 485 | | | | 2880 | |
| 9c | 0.204 | 308 | 36.4 | 31.1 | 29.6 | | |
| 10c | 1.02 | 507 | 244.8 | 219.9 | 217.2 | | |
| 11c | 177 | 300 | | | | 130 | |
| 12c | 173.5 | 627 | | | | 1710 | |
| 13c | 170 | 873 | | | | 3560 | |
| 14c | 0.036 | | | | 2233 | | |
| 15c | 0.035 | 300 | | | | 111 | |
| 16c | 20.0 | 879 | | | | 3703 | |
| 17c | 1.02 | | | | | | |
| 18c | 4.335 | 485 | | | | 2880 | |
| 19c | 1.0 | | | | | | |
| 20c | 4.42 | | | | | 2756 | |
| 21c | 4.42 | | | | | 1680 | |
| 22c | 4.335 | | | | | | |
| 23c | 0.212 | 965.4 | 752.5 | 695.4 | 738.2 | 3908 | |
| 24c | 20.0 | | | | | | |
| 26c | 0.208 | 647 | 394.7 | 359.7 | 365.4 | 3218 | |
| 27c | 20.0 | 475 | | | | | 491 |
| 28c | 173.5 | 627 | | | | 1710 | |
| 29c | 4.335 | 475 | | | | | 497 |
| 30c | 1.02 | | | | | | |
| 31c | 4.248 | 1673 | 1614.3 | 1491 | 1655.5 | 5680 | |
| 32c | 20.0 | | | | | | |
| 33c | 4.42 | | | | | | |
| 34c | 1.0 | | | | | | |
| 35c | 1.0 | | | | | | |
| 36c | 20.4 | | | | | | |

The invention claimed is:

1. A method for achieving a high efficiency in an open gas-turbine process comprising primary and secondary processes in which a supercharger compresses the air required for combustion, which is burned with a fuel in a first combustion chamber, which is followed by a first turbine, a second combustion chamber, a second turbine, a preheating heat exchanger, a pump, and a waste-heat boiler, in which secondary-process feed water is vaporized, comprising the steps of:
- expanding combustion gases after the second combustion chamber in the second turbine to the end of the expansion stage, to a minimum pressure of expansion of the primary process, and to a pressure in the primary process of at least 0.5 bar less than the surrounding atmospheric pressure;
- condensing and removing water vapor arising in combustion and other water vapor from negative-pressure combustion gases at the latest after a precooler following the waste-heat boiler;
- pressurizing part of the combustion gases containing nitrogen of the air and carbon dioxide arising in combustion by the supercharger into the surrounding atmosphere and out of the open gas-turbine process;
- condensing the water vapor arising in combustion in the primary process, into a liquid at a pressure lower than atmospheric pressure;
- taking primary bleed water vapor from the secondary-process turbine and feeding it after the preheating heat exchanger into the gas-turbine process circulation after the supercharger; and
- bringing an amount of additional water at the same pressure level as the secondary-process primary bleed, to the secondary process before the pump.

2. The method according to claim 1, wherein the primary bleed water vapor coming from the secondary process is heated in the preheating heat exchanger.

3. The method according to claim 1, wherein the preheating heat exchanger is formed by the waste-heat boiler.

4. The method according to claim 1, wherein the second turbine is formed by two consecutive turbines.

5. The method according to claim 1, wherein in the secondary process, the water vapor is condensed into liquid in a condenser and is compressed by a pump to a maximum pressure and goes after that to the waste-heat boiler and expands in a high/medium-pressure steam turbine and is intermediately reheated in a heat exchanger and expands in a low-pressure steam turbine before the condenser.

6. The method according to claim 1, wherein precooling of the combustion gases going to the combustion-gas supercharger takes place by water injected into the waste-heat boiler- or precooler.

7. The method according to claim 1, wherein the supercharger is formed of parallel superchargers and/or turbines.

8. The method according to claim 1, wherein natural gas or gasified coal is preheated in a first and second fuel preheating heat exchangers.

9. The method according to claim 1, wherein additional oxygen or air is fed to the gas-turbine process from a supercharger bleed or an oxygen-manufacturing process.

10. The method according to claim 1, wherein the method is used in a district-heating/back-pressure plant in such a way that the district-heating water is heated as desired by combustion gases coming from the waste-heat boiler, together with condensing heat and/or waste heat leaving the heat exchanger.

11. The method according to claim 1, wherein heat exchangers are connected to each other to form the waste-heat boiler.

12. The method according to claim 1, wherein the secondary process is a so-called dual-pressure process, in which water at a lower pressure is preheated and at least partly vaporized in the waste-heat boiler, after which it is combined with the steam circulation coming from the turbine before or after the heat exchanger.

13. The method according to claim 1, wherein reheating of the water vapor of the secondary process is accomplished by either a waste-heat boiler, or by the waste heat of the combustion-gas supercharger in the heat exchanger.

14. The method according to claim 1, wherein the supercharger is formed of two superchargers.

15. The method according to claim 1, wherein the bleed coming from the secondary process is fed to the combustion chamber.

16. The method according to claim 1, wherein the water vapor arising in combustion is removed from the process before or after the precooler.

17. The method according to claim 1, wherein additional air or additional oxygen to be fed to the second combustion chamber is taken from a supercharger bleed or an oxygen-manufacturing process.

18. The method according to claim 1, wherein the preheating of the secondary process primary or secondary bleed takes place in the waste-heat boiler.

19. The method according to claim 1, wherein the cooling of the second turbine takes place by bleed taken from the supercharger so that the temperature of mass flow used for cooling the second turbine can be altered.

20. The method according to claim 1, wherein, after the waste-heat boiler in the secondary circulation, part of the mass flow in the water-vapor circulation is separated and combined after a decompression valve with water vapor coming from the turbine.

21. The method according to claim 1, wherein the primary bleed of the secondary circulation is 0-100% of mass flow going to the steam turbine.

22. The method according to claim 1, wherein district-heating water is first heated in the heat exchanger, including the utilization of the condensation heat of the water vapor arising in combustion, after which it goes to the heat exchanger, which is the secondary-circulation condenser.

23. The method according to claim 1, wherein unburned oxygen also goes to the primary-process combustion-gas supercharger.

* * * * *